United States Patent [19]

Ovshinsky et al.

[11] 3,763,468

[45] Oct. 2, 1973

[54] LIGHT EMITTING DISPLAY ARRAY WITH NON-VOLATILE MEMORY

[75] Inventors: Stanford R. Ovshinsky, Bloomfield Hills; Gordon R. Fleming, Pontiac, both of Mich.

[73] Assignee: Energy Conversion Devices, Inc., Troy, Mich.

[22] Filed: Oct. 1, 1971

[21] Appl. No.: 185,638

[52] U.S. Cl. ........................ 340/166 EL, 340/166 R
[51] Int. Cl. ........................ G06k 15/18, G08b 5/36
[58] Field of Search .................. 340/166 EL, 166 R

[56] References Cited

UNITED STATES PATENTS

| | | | |
|---|---|---|---|
| 2,922,076 | 1/1960 | Sack | 340/166 EL |
| 3,381,289 | 4/1968 | Arnold | 340/324 M |
| 3,422,270 | 1/1969 | Moulton | 340/166 EL |
| 3,618,071 | 11/1971 | Johnson | 340/166 EL |
| 3,622,996 | 11/1971 | Bath | 340/166 EL |

*Primary Examiner*—Harold I. Pitts
*Attorney*—Edward G. Fioritto et al.

[57] ABSTRACT

A light emitting display array which has a plurality of circuit lines in spaced apart relation to form a plurality of non-connected junctures across each of which is connected a light-emitting circuit which is selectively activated between stable ON and stable OFF conditions to form a lighted display pattern. Each of the light-emitting circuits includes a light-emitting element connected in circuit with a non-volatile semi-conductor memory threshold switching device capable of being selectively activated between high resistance current blocking and low resistance current conducting conditions which remain permanently in the semiconductor material forming the memory threshold switching device even when power is removed therefrom or the polarity reversed. Where there exist a great difference in impedence between the moemory threshold switching device used and the particular light-emitting device connected thereto, there is provided a bridge circuit arrangement to compensate for such differences, and which includes threshold isolation means to prevent address signal information from activating undesired light emitting circuits. In the case where threshold isolation means is used it can take the form of a neon lamp or a gallium arsenide diode or the like and function as both the isolation means and the light emitting element. A display pattern can be formed on the display array either with or without operating potential applied thereto and the display array can be stored for indefinite periods of time without affecting the condition of the display pattern formed on the array.

15 Claims, 15 Drawing Figures

INVENTORS
STANFORD R. OVSHINSKY
GORDON R. FLEMING by: Wallenstein, Spangenberg, Hattis & Strampel
ATTYS.

INVENTORS
STANFORD R. OVSHINSKY
GORDON R. FLEMING by: Wallenstein, Spangenberg, Hattis & Strampel
ATTYS.

INVENTORS
STANFORD R. OVSHINSKY
GORDON R. FLEMING
by: Wallenstein, Spangenberg, Hattis & Strampel
ATTYS.

LIGHT EMITTING DISPLAY ARRAY WITH NON-VOLATILE MEMORY

BACKGROUND OF THE INVENTION

This invention relates generally to information storing arrays, and more particularly to light-emitting display arrays. Specifically, this invention is directed to non-volatile display arrays using memory type threshold switching material wherein information display patterns formed on the arrays remain permanently even when power is removed therefrom but which display patterns are selectively alterable as desired.

Heretofore, light-emitting display arrays have been formed for providing selectively changeable display patterns. Such arrays are readily formed in matrix fashion to provide a multitude of discrete light-emitting elements upon the viewing surface of a display screen, and these light-emitting elements are selectively energized either randomly or sequentially one group at a time as, for example, a row or a column at a time, to form line scanning pattern. However, display arrays of the above mentioned type usually require operating potential continuously to be applied thereto in order that the pattern formed thereon remains in its selected condition, and once the operating potential is removed from the array the previously existing display pattern is completely removed. Therefore, each time operating potential is applied to the display array, so also must there be provided display pattern signal information selectively to energize desired discrete portions of the display screen to again reproduce the display pattern. This offers no great disadvantage where it is desired continuously rapidly to change the display pattern formed on such arrays by the application of new display signal information as required. However, where the display pattern to be formed on the display array is to be the same as a previously existing display pattern, the requirement of again applying to the array display pattern signal information is a time consuming and inefficient approach. Furthermore, it is almost always required that display arrays of the prior art continuously be connected to a display pattern signal information generator which will randomly or sequentially energize the desired discrete light emitting portions on the display array or screen. This means that for each display array there must be provided a relatively expensive scanning and pulse generating apparatus in addition to means for applying operating potential to the array.

It may be possible to form such non-volatile memory display arrays by using relatively expensive magnetic core or magnetive film memory material. Such approach not only is expensive but also requires a relatively cumbersome display screen to be formed as well as requiring the use of expensive and complex mechanical and electrical equipment to operate such a display screen.

Accordingly, it is an object of this invention to overcome the disadvantages of light emitting display arrays of the above mentioned type of providing a display array with non-volatile memory at each of a multitude of discrete light emitting portions on the display screen formed on the array so that a display pattern will remain substantially unchanged even when operating potential is removed therefrom.

Another object of this invention is to provide a light-emitting display array wherein the means for providing display pattern signal information need not be connected to the array except when initially forming or altering display patterns thereon.

Yet another object of this invention is to provide a non-volatile memory display array which is relatively simple and inexpensive to manufacture.

Other objects, features and advantages of this invention will be more fully realized and understood from the following detailed description when taken in conjunction with the accompanying drawings wherein like reference numerals throughout the various views of the drawings are intended to designate similar elements or components.

DESCRIPTION OF THE PREFERRED EMBODIMENT

Figure 1:
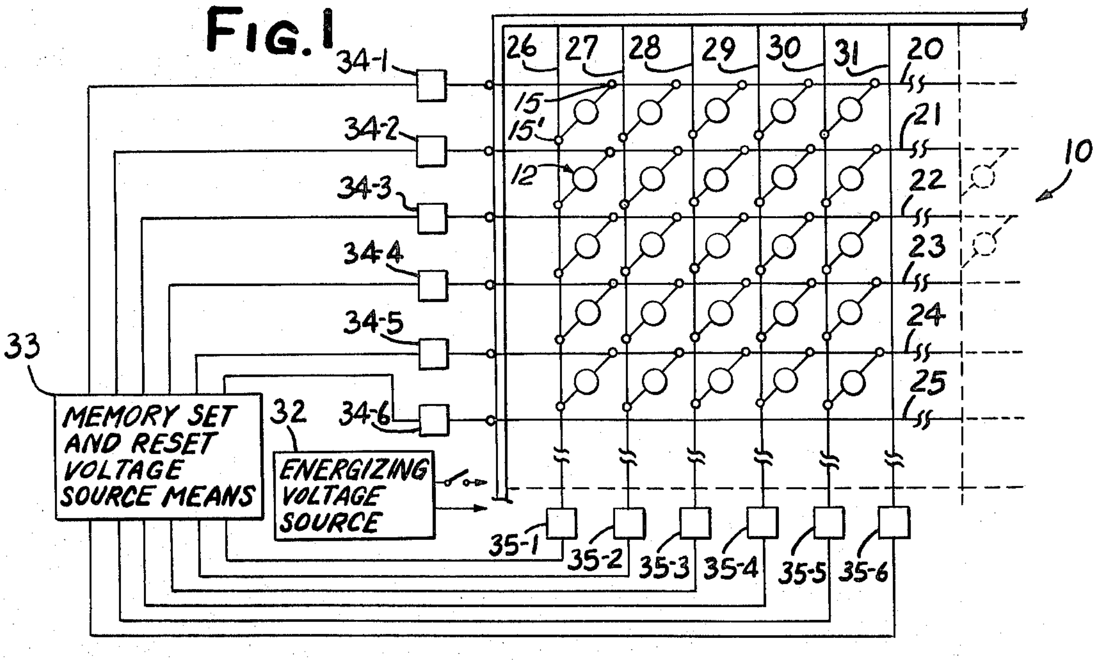
FIG. 1 is a simplified schematic diagram illustrating a fragmentary portion of the light-emitting display array of this invention.
Figure 2:
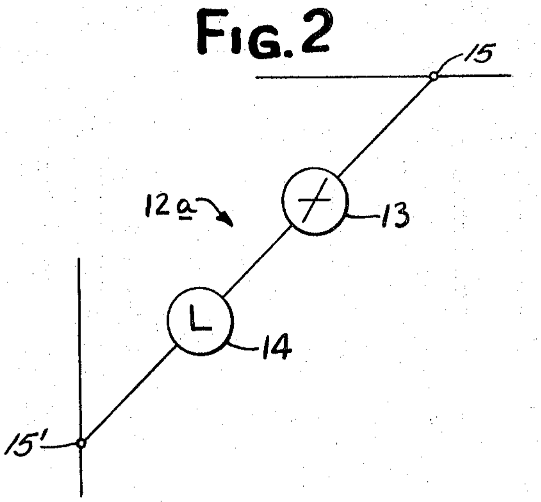
FIG. 2 is a schematic diagram of an exemplary light control circuit used at each light-emitting point of the array and comprising a memory element and a light-emitting element not needing an additional isolating element.
Figure 3:
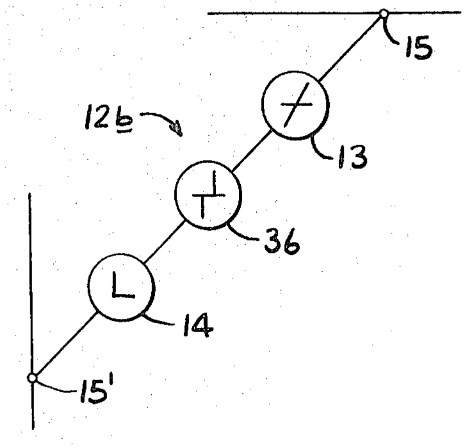
FIG. 3 is a schematic diagram of another exemplary light control and emitting circuit used at each light-emitting point of the array and comprising, in addition to the elements shown in FIG. 2, an isolating element for isolating the light control and emitting circuit from other points of the array.
Figure 4:
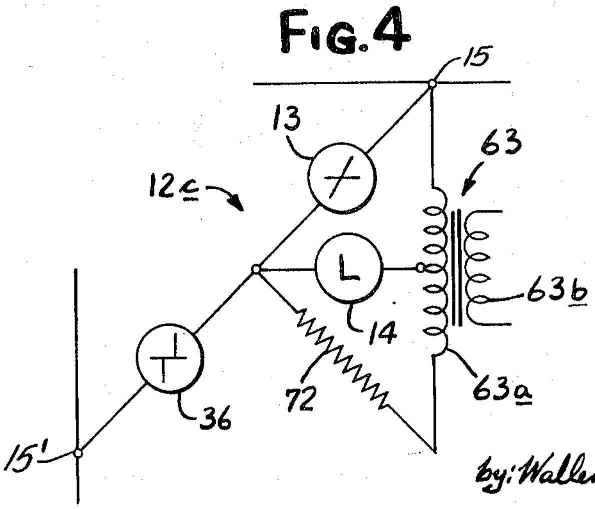
FIG. 4 is a schematic diagram of still another exemplary light control and emitting circuit used at each light-emitting point of the array and comprising memory, isolation and light-emitting elements arranged in a different manner from that shown in FIG. 3.

Referring now to FIG. 1, a non-volatile light-emitting display array 10 is thereshown comprising a plurality of light control and emitting circuits 12, each of which may comprise only a memory element 13 and a light-emitting element 14 like that shown by the light control and emitting circuit 12*a* in FIG. 2 or may comprise additional elements to be described like that shown by the light control and emitting circuits 12*b* and 12*c* shown in FIGS. 3 and 4 to be described. The light control and emitting circuits 12*a*, 12*b* or 12*c* are physically arranged in rows and columns and connected between juncture points or terminals 15—15′ along crossing row circuit lines 20, 21, 22, 23, 24 and 25 etc. and column circuit lines 26, 27, 28, 29, 30 and 31 etc. In some cases, like that shown in FIGS. 2 and 3, the light-emitting and memory elements of each circuit 12 are connected in series between the circuit junctures 15—15′ and in other cases, like that shown in FIG. 4, other circuit arrangements may be provided. The light-emitting elements can be discrete elements like neon tubes, light-emitting diodes and incandescent filaments, or portions of an integral layer or body such as a layer of electroluminescent material, a liquid crystal, a plasma cell or the like. (The term "light-emitting element" is intended to include elements which generate light when energized with a voltage or current or elements which vary the amount of light reaching an observer, as by varying the reflectivity or transmitability of light directed thereto from another light source, depending upon the presence or absence of an energizing voltage or current applied thereto.)

The display array 10 has a particular advantage when the display image to be formed thereon is to be changed from time to time between relatively long or short intervals, which may be measured in minutes, hours, or days. (For example, the display array could be useful for displaying flight arrival and flight departure information at airport terminals.) The display array when in use is continuously energized by an energizing voltage source 32 which energizes the light emitting element associated only with memory elements set to a light-emitting state (which may be a high or low resistance state thereof depending upon whether the memory element is in series or parallel with the light-emitting element). The energizing voltage source 32 may be applied to the display array across circuit juncture points 15—15′, which is the case with the embodiments of FIGS. 2 and 3, or may be applied thereto in other ways as through bridge and transformer circuits of which FIG. 4 to be described is an example. The information displayed on the array in the embodiments illustrated in the drawings is modified by momentarily connecting across the selected pair or pairs of juncture points 15—15′ memory element setting and/or resetting voltage source means 33 by closing selected row and column switch means 34—1, 34—2, etc. and 35-1, 35-2 etc. connected respectively between the aforesaid row circuit line 20-25 and column circuit lines 26-31 and the voltage source means 33. Where a memory element is connected in series with a light emitting element, as in the cases of the examples of the invention to be described, the set or light-emitting state of the memory element is a low resistance state thereof where most or a substantial portion of the output of an energizing voltage source 32 is applied to the associated light emitting element to produce light at the point of observation thereof at the front of the display array, and the reset state of the memory element is a relatively high resistance state where an insignificant portion of the output of the energizing voltage source 32 is applied to the light-emitting element so little or no light appears at the front of the array. However, particularly where a light-emitting element operates as a variable light reflecting or light transmitting element, the presence of a substantial portion of the output of the energizing voltage source 32 across the light-emitting element may result in the disappearance of light in front of the array.

In the embodiment of the invention illustrated in FIG. 1, to set a memory element to a low resistance light-producing state, a given row and column switch means is momentarily closed to couple a setting voltage to the memory element involved from the memory set and reset voltage source means 33 to switch the same to a stable low resistance state where the energizing voltage source 32 applies sufficient voltage to the light-emitting element 14 to energize the same. The low resistance state of a memory element can be reset to its initial high resistance state by momentarily applying a suitable reset current thereto by momentary reclosure of the appropriate row and column switch means. As previously indicated, once a memory element has been set or reset to a given high or low resistance state, such resistance state persists indefinitely, even upon disconnection from the array of all sources of voltage, so that a non-volatile display array results.

After a given pattern of memory element set states have been established in the array, the memory setting and resetting voltage source means 33 and the control means (not shown) for the switch means 34-1, 34-2, etc. and 35-1, 35-2 etc. may be disconnected from the display array 10 for use with other display arrays until a further charge in the display pattern is desired. The memory element forming part of each light control and emitting circuit 12 is a non-volatile memory element which remains in its set or reset state when all sources of voltage are removed therefrom.

Each of the light control and emitting circuits should include some isolating element for isolating each light control and emitting circuit 12 from other similar circuits in the array, to avoid short circuit paths preventing the setting of a memory element of a selected light control and emitting circuit. In the embodiment of the invention shown in FIG. 2, the light-emitting element 14 itself constitutes an isolating element in addition to being a light-emitting element, as in the case where the light-emitting element is a neon tube or a light emitting diode. Where the memory element setting voltage has a slow rise time, as in the case of sinusoidal waveform of relatively low frequency, a capacitive light-emitting element like an electroluminescent material can offer sufficient electrical impedance to act as an isolating element in the display array.

Figures 13, 14, 15:
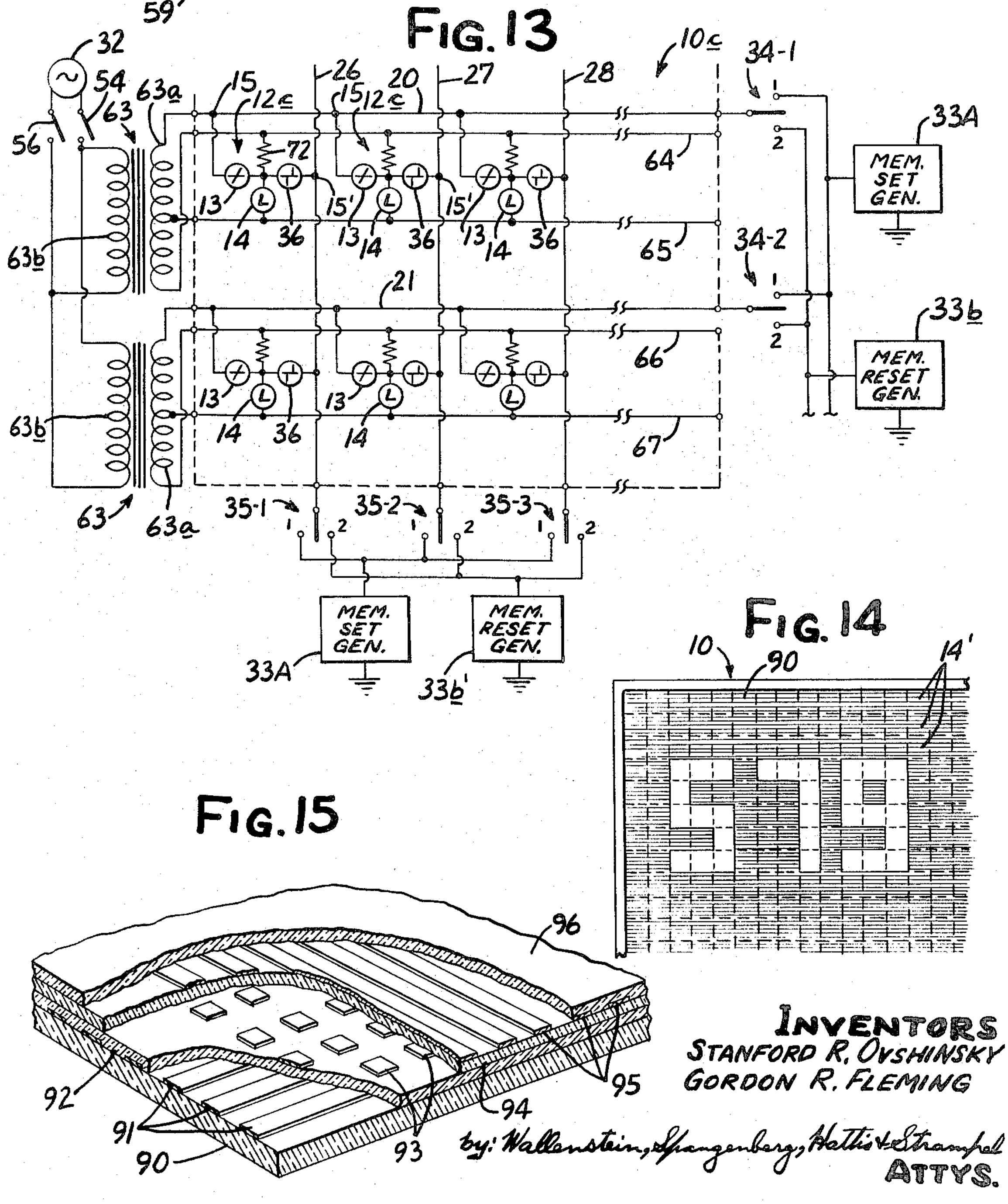
FIG. 13 is a simplified schematic diagram of a portion of a light-emitting display array and the associated array energizing and memory setting and resetting voltage sources associated therewith where the form of light control circuit shown in FIG. 4 is utilized at each light-emitting point of the array.
FIG. 14 illustrates a fragmentary portion of the light-emitting display array of this invention with several numerals displayed thereon.
FIG. 15 is a perspective view showing one form of construction of an electroluminescent display array utilizing the light control and emitting circuit of FIG. 2.

It is preferred that the light emitting elements be different portions of a single electroluminescent layer, and that the aforementioned memory elements be different portions of a layer of a memory material applied as a thin film over the layer of electroluminescent material. Electrical connections to the different portions of these layers can be made by thin lines of transparent conductive material extending over the visible outer face of the electroluminescent layer which lines constitute the row or column lines described above, and by lines of conductive material applied over or associated with the layer of memory semiconductor material extending at right angles to the former lines of conductive material to form a cross-grid matrix as shown in FIG. 15 to be more fully described in the specification to follow. It can be seen that with such a construction, a very simple, compact and inexpensive display array construction results.

The memory element 13 of each light control and emitting circuit 12 is most advantageously a memory threshold switching device like that described in U.S. Pat. No. 3,271,591 to Stanford Ovshinsky as a "Hi Lo device." Such a memory threshold switching device includes a layer of memory material which is capable of having selected portions thereof undergo a physical change in structure between at least two stable conditions. This material is normally in one of these structural conditions and is capable of being switched to another structural condition in response to the application of energy, such as, for example, light, heat, electric field, stress or the like, or a combination of one or more of the foregoing. These physical changes in structure can be, for example conformational changes, configurational changes, or positional changes in the organization or arrangement of atoms or molecules in the memory material. Typical conformational, configurational and positional changes include changes from a generally amorphous condition to a more ordered or crystalline like condition which may include different crystalline states, or the reverse; changes from one crystalline form to another crystalline form; changes in the degree of crystallinity; changes in the relative alignment of molecules or segments thereof; changes in intermolecular bonding and the like; folding up, convoluting, packing, stretching out or otherwise changing the shape or geometry of molecules; opening or closing molecular ring structures and other molecular chain scission; attachment of molecular chains; changes in the average length of molecular chains produced for example by coiling or uncoiling; movement of atoms or molecules from one location to another including both correlated and uncorrelated movement of adjacent atoms or molecules; creation or elimination of voids in the memory material, contraction or expansion of the memory material, breaking up or linking up of bonds between atoms or molecules and combinations of one or more of the foregoing. As an adjunct to these physical changes in structure one or more components of a given memory material may be precipitated out of the material in, for example, a crystalline or amorphous form. The changes can be substantially within a short range order itself still involving a substantially disordered and generally amorphous condition, or can be from a short range order to a long range order which could provide a crystalline condition. Such physical changes in structure, which can be of a subtle nature, provide drastic changes in detectable characteristics of the memory material, such as the electrical resistance thereof.

Figures 5, 6, 7, 8, 9:
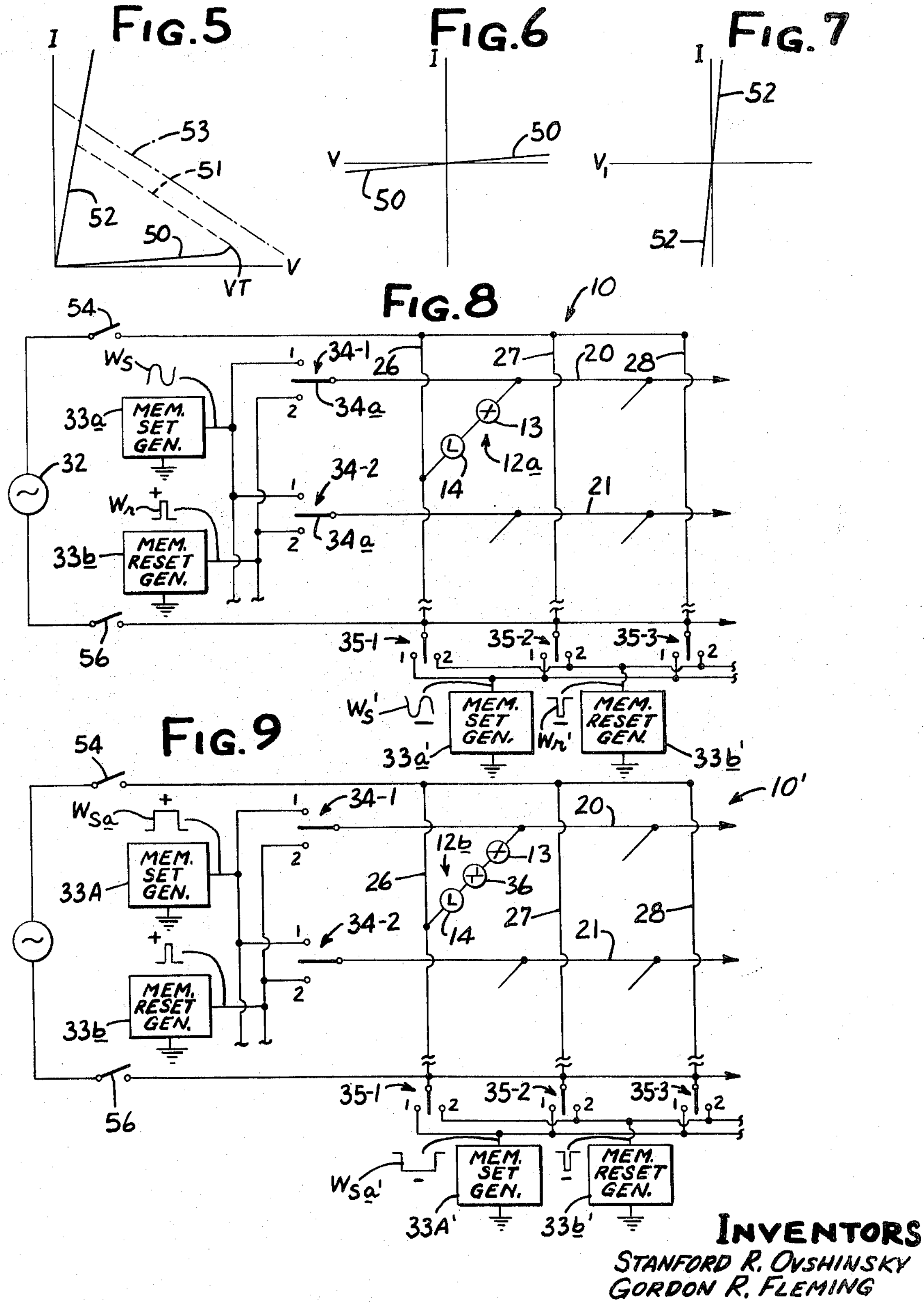
FIG. 5 is a voltage-current curve illustrating the operation of a non-volatile memory type threshold current controlling device which is used in this invention.
FIGS. 6 and 7 are voltage-current curves illustrating the symmetrical operation of the non-volatile memory type threshold current controlling device used as the memory element in accordance with some aspects of this invention.
FIG. 8 is a simplified schematic diagram of a portion of a light-emitting display array and the associated array energizing and memory setting and resetting voltage sources associated therewith where the form of light control circuit shown in FIG. 2 is utilized at each light-emitting point of the array.
FIG. 9 is a simplified schematic diagram of a portion of a light-emitting display array and the associated array energizing and memory setting and resetting voltage sources associated therewith where the form of light control circuit shown in FIG. 3 is utilized at each light-emitting point of the array.

For a better understanding of the electrical characteristics of a memory threshold switching device of the type disclosed in the aforesaid patent, reference is now made to FIGS. 5, 6 and 7 which illustrate the current-voltage characteristics of the device. This memory threshold switching device 13 is symmetrical in its operation, it blocking current substantially equally in each direction and it conducting current substantially equally in each direction, and the switching between the blocking and conducting conditions being extremely rapid. With the device 13 in its normally high resistance blocking condition and with a relatively long time duration voltage applied thereto (at least from about 1 to 100 milliseconds), the voltage current characteristic of the device is illustrated by the curve 50 of FIG. 5, the electrical resistance of the device being high and substantially blocking the current flow therethrough. When the voltage applied thereto has reached a threshold voltage value VT, the high electrical resistance of the memory threshold switching device substantially instantaneously decreases in at least one path through the semiconductor material forming the device to a low electrical resistance, the substantially instantaneous switching being indicated by the curve 51. Current flow must then be maintained through the device 40 for a period of time (i.e., at least from about 1 to 100 milliseconds) permanently to set the device 13 to its stable ON or low electrical resistance state, the low electrical resistance involved being many orders of magnitude less than its high electrical resistance. The conducting condition is illustrated by the curve 52 and it is noted that there is a substantially ohmic voltage-current characteristic. In other words, current is conducted substantially ohmically as illustrated by the curve 52. In this low resistance current conducting state, the semiconductor material forming the memory threshold switching device has a negligible voltage drop which is a minor fraction of the voltage drop when the device is in its high resistance blocking state.

As the voltage applied thereto is then decreased, the current decreases along the curve 52 to zero as the voltage decreases to zero. Thus, the memory threshold switching device 13 is a non-volatile memory because its low resistance state will remain even though current is decreased to zero or reversed, this low resistance state persisting until it is reset to its high resistance blocking state as hereinafter described. The load line of the circuit to which the memory threshold switching device 13 is connected is illustrated by the curve 53, it being substantially parallel to the switching curve 51. When a current pulse (i.e., a current with a fast rise time) and a relatively short time duration, (e.g., the order of 1 to 10 microseconds) and in excess of a given value is applied to the memory threshold switching device 13, the memory type threshold switching device is reset from its low resistance to its high resistance state indicated by the curve 50. The memory threshold switching device 13 will remain in its high resistance state until again switched to its low resistance state by the reapplication of a voltage at least having the threshold voltage value VT and appropriate time duration.

In the case of AC operation, (i.e., voltage alternating in polarity like a sine wave or square wave voltage) the voltage current characteristics of the opposite or negative going half cycle are in the opposite or third quadrant from that illustrated in FIG. 4 and of identical form. The AC operation of the memory threshold switching device 40 is illustrated in FIGS. 6 and 7. FIG. 6 illustrates the device in its high resistance state where the peak value of the AC voltage is below the threshold voltage value VT of the device, the high resistance state being illustrated by the almost horizontal slightly sloping curves 50—50 in both half cycles where the device blocks current flow substantially equally in both directions of current flow. When the peak value of the applied AC voltage increases above the threshold voltage value of the memory threshold switching device 13, the device substantially instantaneously switches to the conducting condition illustrated by the steep curves 52—52 of FIG. 7 and, after a short time duration of current flow, it remains in this conducting condition regardless of the reduction of the current to zero or the reversal of the current.

Refer now to FIG. 8 which shows the preferred manner for setting and resetting selected memory threshold switching switching devices 13 of any light control and emitting circuit 12*a* where the light-emitting element 14 is a capacitive element like an electroluminescent element. As thereshown, the memory set and reset voltage source means 33 shown by a single box in FIG. 1 comprises separate memory setting and memory resetting signal generators. The memory setting signal generator has a generator section 33*a* which, as illustrated, produces a slowly rising waveform like a relatively low frequency sinusoidal waveform W*s* which is applied to a selected row circuit line of the array, and a generator section 33*a'* which produces a similar sinuoidal waveform Ws' which is 180° out of phase with the waveform W*s* and is applied to a selected column circuit line of the array. Thus, waveforms W*s* and W*s'* are at any given instant of opposite polarity relative to a ground reference voltage.

The memory element setting voltages indicated by the waveforms W*s* and W*s'* are fed simultaneously to the selected row and column lines through the aforesaid switch means 34–1, 34–2, etc. associated with the row circuit lines and the switch means 35–1, 35–2 etc. associated with the column circuit lines. To this end, the output of generator selection 33*a* is coupled to the No. 1 input terminals of the row circuit line switch means 34–1, 34–2, etc. and the output of generator section 33*a'* is coupled to the No. 1 input terminals of the column circuit line switch means 35–1, 35–2 etc. A computer or other control means (not shown) control path directing means of each of these switch means identified diagrammatically as the movable poles 34*a* and 35*a* of single pole, double throw switches which couple the output of the generator section 33*a* and 33*a'* to the selected row and column circuit line.

The memory resetting generator has a section 33*b* which produces a narrow current pulse W*r* of one polarity and a generator section 33*b'* which produces a narrow current pulse W*r'* of opposite polarity. These generator sections 33*b* and 33*b'*, which are respectively connected to the No. 2 input terminals of the row and column circuit line switch means, simultaneously produce such current pulses in a capacitive load, as where the light-emitting elements 14 are capacitive elements, by generating square topped or fast rising voltages fed to the selected row and column circuit lines through the No. 2 input terminals of the row and column circuit line switch means.

The effective amplitude of the voltages applied across a selected light control and emitting circuit 12*a* will be the sum of the output voltages of the memory setting and resetting generator sections. The portion of the resultant voltage produced by the memory generator sections 33*a* and 33*b* actually appearing across a selected memory threshold switching device 13 when the voltage waveform W*r* and W*r'* are sinusoidal waveforms depends upon the relative AC impedances of the memory threshold switching devices 13 and the capacitive electroluminescent element 14. Where the high resistance state of a memory threshold switching device 13 has a resistance which is substantially smaller then the AC impedance of the electroluminescent element 14, it is apparent that the sum of the waveforms W*s* and W*s'* must be much greater than the actual threshold voltage value of the memory threshold switching device 13.

The energizing voltage source 32 for energizing the display array 10 is illustrated in FIG. 8 as being a source of sinewave voltage whose opposite terminals are respectively connected through switches 54 and 56 respectively to the various row and column circuit lines so that, after the memory threshold switching devices 13 at the various crossing points of the array have been appropriately set and reset to various high and low resistance states to obtain the proper display pattern, light will be emitted from those points of the display array having threshold memory switch devices switched to their low resistance states. The output of the energizing voltage source 32 must, of course, be of a magnitude or waveshape which will not produce a resetting current in the set memory threshold switching devices.

Where the memory threshold switching device 13 has a much lower resistance in its high resistance state than the impedance of the electroluminescent element 14, only modest changes of voltage occurs across the electroluminescent element as the memory threshold switching device 13 is driven from its initial high resistance state to its low resistance state. It is desired that this small change of voltage across the electroluminescent element 14 produces a variation in light intensity from one which is practically invisible to one which is relatively bright. This result can be achieved if the electroluminescent material forming the electroluminescent element 14 has a non-linear voltage verses light output characteristic, so that small changes in voltage applied thereto will result in large changes in relative light output.

Where the light emitting element of a light control and emitting circuit does not supply a sufficient isolating impedance to prevent set inhibiting shunting paths across a selected light control and emitting circuit, a separate isolating element like a non-memory type threshold switch device 36 shown in FIG. 3 can be added in series with the non-isolating light-emitting element 14 which may be an incandescent filament of low resistance, or an electroluminescent element where fast rise time setting voltages are utilized. Such a non-memory type threshold switch device is disclosed in said U.S. Pat. No. 3,271,591. Such a device is basically one which is fired into a low resistance state when the voltage applied thereto exceeds a given threshold voltage value which state persists until the current flow therethrough goes below a given minimum holding current valve.

Figure 10:
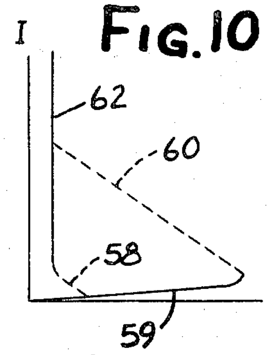
FIG. 10 is a voltage-current curve illustrating the operation of a non-memory type threshold current controlling device which can be used as the isolating element in the circuit arrangement of FIGS. 3 and 4.
Figure 11:
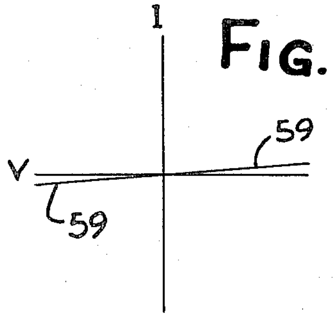
FIGS. 11 and 12 are voltage current curves illustrating the symmetrical operation of the non-memory type threshold current controlling device.
Figure 12:
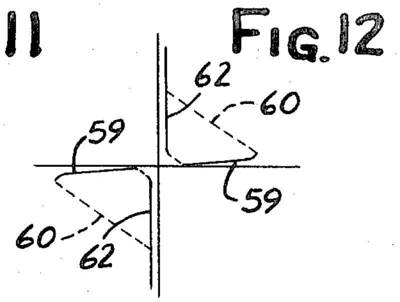

For a better understanding of the electrical characteristics of the preferred non-memory type threshold switching device 36, reference is now made to FIGS. 10, 11 and 12. FIG. 10 is an I–V curve illustrating the DC operation of the non-memory type current controlling device 36. When the device 36 is normally in its high resistance blocking state and a DC voltage is applied across the terminals of the device and increased, the voltage-current characteristics of the device are illustrated by the curve 59, the electrical reistance of the device being high and substantially blocking current flow therethrough. When the voltage is increased to a threshold voltage value, the high electrical resistance of the semiconductor material forming the device substantially instantaneously decreases in at least one path therethrough to establish a low electrical resistance, the substantially instantaneous switching being indicated by the curve 60. This provides a low electrical resistance or conducting state for conducting current through the device 36 to apply a threshold voltage to the memory type threshold switching device 13 connected in circuit therewith. The low electrical resistance of the non-memory type threshold switching device is many orders of magnitude less than the high resistance thereof. The conducting condition is illustrated by the curve 62 and it is noted that there is a substantially linear voltage current characteristic and a substantially constant voltage characteristic which are the same for increases and decreases in current. In other words, current is conducted at a substantially constant voltage. In the low resistance current conducting state the semiconductor material forming the non-memory type switching device 36 has a voltage drop thereacross which is a minor fraction of the voltage drop in its high resistance blocking condition below or near the threshold voltage value.

As the voltage across the non-memory type threshold switching device 36 is decreased, the current decreases along the curve 62 and when the current decreases below a minimum current holding value, the low electrical resistance of the conducting path or paths through the semiconductor material forming the device immediately returns to the high resistance state, as illustrated by the curve 58 to re-establish the high resistance blocking condition. In other words, a minimum holding current is required to maintain the non-memory type threshold switching device 36 in its conducting condition and when the current falls below a minimum current holding value, the low electrical resistance immediately returns to the high electrical resistance.

Refer now to FIG. 9 which shows the manner in which the light control and emitting circuit 12*b* of FIG. 3 is controlled. The display array shown in FIG. 9 is similar to the display array shown in FIG. 8 except that memory set generator sections 33A and 33A' are provided which produce different output voltage waveforms W*sa* and W*sa'* than memory set generator sections 33*a* and 33*a'* in FIG. 8. Thus, memory set voltage waveforms Wsa and Wsa' are shown as square topped pulses rather than slowly rising waveforms W*s* and W*s'*, and the sum of the amplitudes of the square topped voltage waveforms W*sa* and W*sa'* must have a value to effect the firing of memory threshold switching device 13 and the non-memory type threshold switching device 36. The non-memory type threshold switching device 36 is a device like memory threshold switching device 13 only in the respect that the application of a voltage in excess of a given threshold voltage value will drive the same from its normal high resistance state to a low resistance state. However, as above indicated, the low resistance state of the non-memory type threshold switching device 36 persists only so long as current flow above a given magnitude continue to flow therein. If the resistance of the high resistance states of the memory threshold switching device 13 and non-memory type threshold switching device 36 are of the same magnitude, then the sum of the amplitude of the setting voltages W*sa* and W*sa'* must exceed the sum of the threshold voltage values thereof if the impedance of light-emitting element 14 is insignificantly small (which is the case where the light-emitting element 14 is a capacitive element and fast rise time set voltages are used). However, if the resistance of the high resistance state of the non-memory type threshold switching device 36 is many times greater than that of the memory threshold switching device 13 and the impedance of the light-emitting element, then the applied voltage can be much smaller than the summation values referred to because most of the applied voltage will first appear across the non-memory type threshold switching device 36 to fire the same into its low resistance state, which will then result in the coupling of most of the applied voltage across the memory threshold switching device 13 to switch the same into its low resistance state.

The form of the invention of FIG. 2 just described utilizing the non-memory type threshold switching device 36 in series with a memory threshold switching device 13 and a light-emitting element 14 overcomes the aforesaid problem where the impedance of the memory threshold switching device 13 in its high resistance state is much smaller than the impedance of the light-emitting element 14 at the frequency of the energizing voltage source 32, because the isolating element 36 in its high resistance state normally has a resistance much greater than that of the memory threshold switching device and the light-emitting element 14 even when the latter is an electroluminescent element. However, the use of a capacitive light-emitting element can cause some problems in reliably assuring the generation of a proper reset current pulse for resetting the memory threshold switching device 13. To eliminate such a problem, it is desirable that the resetting circuit for the memory threshold switching device 13 be independent of the light-emitting element 14, as in the case of the circuit shown in FIG. 4 to which reference should now be made. In this circuit, the memory threshold switching device 13 and the non-memory type threshold switching device 36 are connected directly in series between the juncture points 15 and 15' connected to the row and column circuit lines used in setting and resetting the memory threshold switching devices 13. The capacitive light-emitting element 14 is connected between the juncture of the memory and non-memory type threshold switching devices 13 and 36 and the center tap of a secondary winding 63a of a transformer 63 whose primary winding 63*b* is connected to the energizing voltage source 32 through the aforementioned switches 54 and 56. The opposite ends of the secondary winding 63a are respectively connected to the juncture point 15 and to one end of a resistor 72 whose opposite end is connected to the juncture of the memory and non-memory type threshold switching devices 13 and 36.

The two halves of the secondary winding 63a form two arms of an AC bridge circuit and the resistor 72 and the memory threshold switching device 13 form the other two arms of the AC bridge circuit. The resistance of resistor 72 is made equal to the resistance of the memory threshold switching device 13 in its high resistance state so that the bridge will then be balanced. The light-emitting element 14 is connected across the output of the bridge circuit. When the memory threshold switching device 13 is set to its low resistance state, the bridge will become substantially unbalanced to feed sufficient AC voltage to energize the same. With this bridge circuit, the fact that the resistance of the memory threshold semiconductor device 13 in its high resistance state is much less than the AC impedance of the light-emitting element 14 is of no consequence.

FIG. 13 shows the light control and emitting circuit 12*c* of FIG. 3 duplicated in a display array 10' having the same basic components as shown in the array 10 of FIG. 8 which components have been similarly numbered. The row circuit lines 20, 21 etc. form in addition to lines connecting to the juncture points 15 and common row circuit line switches 34–1, 34–2, etc. common conductors extending to one of the corresponding ends of row secondary windings 63*a* whose primary windings 63*b* are connected in parallel across the AC energizing voltage source. Row circuit lines 64, 66, etc. extend between the opposite corresponding ends of the row secondary windings 63*a* and the resistors 72. Row circuit lines 65, 67, etc. extend between the center tap points of the row secondary windings 63*a* and the light-emitting elements 14.

It is apparent that the various non-memory type threshold switching devices 36 isolate the various light control and emitting circuits 12*c* from one another to prevent set and reset signal information from affecting operation of non-selected light control and emitting circuits 12*c*. To apply a set or reset signal to the display array 10' of FIG. 13, desired row and column circuit lines having the circuit junctures 15—15' are coupled through the No. 1 or No. 2 terminals of the row and column switch means 34–1, 34–2 etc. and 35–1, 35–2 etc. to the memory set or reset generator sections 33A—33A' and 33*b*–33*b*' in the manner previously described in connection with the embodiment of the invention shown in FIG. 8.

While the embodiment of FIGS. 4 and 13 illustrate the use of an AC bridge circuit which is needed, for example, where the light-emitting element is a capacitive element operating from alternating current, the bridge circuit concept is equally applicable to arrays with DC operated light-emitting elements in which event the bridge circuit shown in FIG. 4 would be modified to form a DC bridge circuit.

Referring now to FIGS. 14 and 15, there is shown the physical construction of an exemplary display array using the light control and emitting circuit 12*a* of FIG. 2. The light-emitting elements 14 are here formed by discrete portions 14' of a layer 92 of an electroluminescent phosphor material. This layer of electroluminescent material is deposited on a transparent substrate 90 forming the front face of the display array to which substrate has been previously deposited parallel transparent electrodes strips 91 of tin oxide or the like forming the aforesaid column circuit lines. Intermediate electrodes 93 are deposited in rows and columns over spaced areas of the rear surface of the electroluminscent layer 92 in alignment with the transparent electrode strips 91. The memory threshold switching devices are formed by discrete portions or layers of a film 94 of memory semiconductor material applied over the rear surface of the electroluminescent layer 92 and the intermediate electrodes 93. The intermediate electrodes 93 provide good electrical contact between the discrete portions of the memory semiconductor layer 94 forming the individual threshold switching devices 13 and the discrete portions of the electroluminescent layer 92 forming the non-memory type threshold switching device.

Positioned over the layer 94 of memory semiconductor material are parallel electrodes 95 arranged at right angles to the transparent electrodes 91 and in alignment with the row or columns of intermediate electrodes 93. A layer 96 of bonding material, such as an epoxy material is placed over the memory semiconductor material layer 94 and electrodes 95 to seal the component layers of the material forming the display array. Therefore, the entire electroluminescent array, including a multitude of memory threshold switching devices, is formed as a single integral unit.

FIG. 14 illustrates part of the front face of the display array 10 constituted by the transparent substrate 90. In FIG. 14, the display array 10 has formed thereon the numerals 5, 7 and 9 formed by applying proper memory setting voltages to the row and column electrodes 91 and 95 to display the desired pattern of energized electroluminescent areas forming the desired numerals.

It should be understood that many variations may be made in the most preferred forms of the invention described above without deviating from the broader aspects of the invention.

The claims

1. A display array comprising: a plurality of row circuit lines and a plurality of column circuit lines respectively having circuit junctures therealong to form pairs of circuit juncture points along different combinations of said row and column circuit lines across which juncture points memory element set and reset signal producing means are selectively connectable, a light control and emitting circuit associated with each of said pair of circuit juncture points and each including isolating and light-emitting means and a variable resistance memory element arranged in a circuit where said memory element is connected to the associated pair of circuit juncture points where memory element set and reset signals are applied through an impedance supplied by said means which isolates the same from the other memory elements of the array and where the associated said means and memory element are connectable to energizing voltage source means so the associated said means receives a light producing voltage or current when the associated memory element is in a light producing resistance condition, each of said variable resistance memory elements including memory material having at least two stable conditions respectively where the memory material has one stable structural condition where the resistance of the memory element is relatively high and a different structural condition where the resistance of the memory element is relatively low, said portions of variable resistance memory material including means capable of undergoing a stable reversible physical change in structure, by momentary application of energy thereto, selectively to either of said stable conditions by the signals of said memory set and reset signal producing means, said stable conditions persisting indefinitely after all signal sources have been removed therefrom, and each of said light - emitting means being related to the associated variable resistance memory element to receive said light producing voltage or current when said associated variable resistance memory material is in one of said stable conditions constituting a light producing condition and not to receive said light producing voltage or current when the variable resistance memory material of the associated memory element is in the other stable condition.

2. The display array of claim 1 wherein said isolating and light-emitting means associated with each pair of circuit juncture points is a single element which supplies said isolating impedance and produces said light.

3. The display array of claim 1 wherein said isolating and light-emitting means associated with each pair of circuit juncture points are a pair of elements, one of which produces light but has such a small impedance as not to supply said isolating impedance and the other element is an element supplying said isolating impedance.

4. The display array of claim 1 wherein there is provided switching means for selectively connecting said memory element set and reset signal producing means to a selected one of said row circuit lines and to a selected one of said column circuit lines to apply the same to a selected pair of juncture points.

5. The display array of claim 4 wherein only the memory element and isolating element associated with each pair of circuit juncture points is connected in series across such pair of juncture points, said memory element and light producing means associated with each pair of circuit juncture points being connectable to said energizing voltage source means through an energizing circuit which does not include said isolating element.

6. The display array of claim 5 wherein said energizing circuit is a bridge circuit having one arm including said memory element and three other arms excluding the associated light producing means, the bridge circuit having energizing voltage input terminals to which said energizing voltage source means is applied and a pair of output terminals across which no voltage appears when the bridge circuit is in a balanced condition and across which an output appears when the bridge circuit is unbalanced, the light producing means associated with each pair of circuit functure points being connected across said output terminals of the bridge circuit, and said bridge circuit being unbalanced only when said memory element is in said light producing condition.

7. The display array of claim 6 wherein the resistance of each memory element in its high resistance condition is substantially less than the impedance of said light producing means.

8. The display array of claim 1 wherein the memory and light-emitting means associated with each pair of circuit juncture points are connected in series circuit relation when said energizing voltage source means is connected thereto, and wherein the light-emitting means receives a light-emitting current or voltage only when the associated memory element is in its low resistance condition.

9. The display array of claim 1 wherein each of said light-emitting means is an electroluminescent element.

10. The display array of claim 1 wherein the isolating and light-emitting means of each light control and emitting circuit associated with each pair of circuit juncture points is a single threshold-type element which emits light when the voltage applied thereto exceeds a given threshold voltage level which ocurrs when the associated memory element is said light producing condition.

11. The display array of claim 4 wherein said isolating and light-emitting means of each light control and emitting circuit associated with each pair of circuit juncture points is a single capacitive element where the capacitance of the element is sufficient to form isolation between said memory elements when said set signal is a relatively slowly rising signal where the capacitive element does not act as a short circuit for the set signal.

12. A display array comprising a plurality of spaced, light-emitting elements each of which is to produce a visible light at an observation point in front of the array when the same is supplied with energizing voltage, a variable impedance memory element associated with each light-emitting element, each variable impedance memory element having a stable high impedance condition which is changeable to a stable low impedance condition by the momentary application thereto of a memory element setting signal, and being resettable back to its stable high impedance condition by the momentary application thereto of a memory element resetting signal, the high impedance of each memory element supplying an impedance smaller than the impedance of the associated light-emitting element, whereby the memory element acts as an ineffective switch for controlling the application of energizing to the associated light-emitting element if connected in a simple series circuit between a source of energizing voltage and the associated light-emitting element, means for selectively feeding memory element setting and resetting signals to any memory element associated with any one of said light-emitting elements, and circuit-forming means for supplying energizing voltage to each of said light-emitting elements under the control of the impedance condition of the associated memory element each of said circuit-forming means forming with each memory element a bridge circuit having a pair of input terminals across which energizing voltage for the light-emitting element is applied and a pair of output terminals across which appreciable energizing voltage appears only when the bridge circuit is unbalanced, each of said light-emitting elements being connected across the output terminals of the associated bridge circuit, the bridge circuit being balanced when the associated memory element in one of said stable impedance conditions and being unbalanced when the associated memory element is in its other stable impedance condition.

13. The display array of claim 12 wherein each of said bridge circuit-forming means includes a first branch with said memory element and an impedance means connected in series across the input terminals of the bridge circuit and another branch in parallel with said first branch and comprising a center-tapped secondary winding of a transformer having a primary winding connectable to a source of AC voltage, said output of said bridge circuit being between the center tap of said secondary winding of said transformer and the juncture between said memory element and said impedance means.

14. The display array of claim 1 wherein the memory element, light producing element and the isolating element are connected in series between the associated pair of circuit juncture points.

15. The display array of claim 3 wherein each isolating element is a two terminal threshold device which is operated in a low resistance condition when a voltage of any polarity in excess of a given voltage is applied thereto.

* * * * *